(12) United States Patent
Schmisseur et al.

(10) Patent No.: US 7,596,652 B2
(45) Date of Patent: Sep. 29, 2009

(54) INTEGRATED CIRCUIT HAVING PROCESSOR AND BRIDGING CAPABILITIES

(75) Inventors: Mark A. Schmisseur, Phoenix, AZ (US); Deif N. Atallah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 10/846,459

(22) Filed: May 14, 2004

(65) Prior Publication Data
US 2005/0256990 A1 Nov. 17, 2005

(51) Int. Cl.
*G06F 13/36* (2006.01)
(52) U.S. Cl. .................. 710/311; 710/306; 710/315
(58) Field of Classification Search ............. 710/62, 710/311, 313–315, 104, 306
See application file for complete search history.

(56) References Cited

U.S. PATENT DOCUMENTS

| | | | |
|---|---|---|---|
| 5,734,847 A * | 3/1998 | Garbus et al. ............ 710/314 |
| 5,751,975 A | 5/1998 | Gillespie et al. |
| 5,761,458 A * | 6/1998 | Young et al. ............ 710/311 |
| 5,778,242 A * | 7/1998 | Wang .................... 712/40 |
| 5,790,831 A * | 8/1998 | Lin et al. ............... 710/315 |
| 5,913,045 A | 6/1999 | Gillespie et al. |
| 5,960,213 A | 9/1999 | Wilson |
| 6,044,207 A | 3/2000 | Pecone et al. |
| 6,073,253 A | 6/2000 | Nordstrom et al. |
| 6,094,699 A | 7/2000 | Surugucchi et al. |
| 6,145,029 A * | 11/2000 | Deschepper et al. ...... 710/36 |
| 6,212,587 B1 | 4/2001 | Emerson et al. |
| 6,230,216 B1 | 5/2001 | Chambers et al. |
| 6,324,609 B1 * | 11/2001 | Davis et al. ............. 710/119 |
| 6,748,478 B1 * | 6/2004 | Burke et al. ............ 710/312 |
| 2002/0178317 A1 * | 11/2002 | Schmisseur et al. ...... 710/305 |
| 2003/0097503 A1 * | 5/2003 | Huckins ................. 710/104 |
| 2003/0188062 A1 * | 10/2003 | Luse et al. ............. 710/104 |
| 2003/0188074 A1 * | 10/2003 | Bronson et al. ......... 710/306 |
| 2003/0196021 A1 * | 10/2003 | Botchek ................. 710/315 |
| 2004/0098645 A1 * | 5/2004 | Beckett et al. .......... 714/724 |
| 2004/0201956 A1 * | 10/2004 | Conway ................. 361/686 |
| 2005/0149658 A1 * | 7/2005 | Martin et al. ........... 710/302 |
| 2005/0240703 A1 * | 10/2005 | Nguyen et al. .......... 710/301 |
| 2005/0256977 A1 * | 11/2005 | Dehaemer et al. ....... 710/5 |

OTHER PUBLICATIONS

"PCI Express to PCI/PCI-X Bridge Specification" Revision 1.0 PCI-SIG. Jul. 14, 2003.*

(Continued)

*Primary Examiner*—Thomas J Cleary
(74) *Attorney, Agent, or Firm*—Christopher K. Gagne

(57) ABSTRACT

An apparatus according to one embodiment may include an integrated circuit. The integrated circuit may include a processor, a bridge, and circuitry capable of coupling the bridge and the processor to a first bus and to a second bus. The first bus may be compatible with a first bus protocol, the second bus may be compatible with a second bus protocol, and the first and second bus protocols may be different from each other. The bridge may be capable of, in response at least in part to a request from the processor, preventing a command received at the bridge via the first bus from being forwarded from the bridge to the second bus. Of course, many alternatives, variations, and modifications are possible without departing from this embodiment.

16 Claims, 2 Drawing Sheets

OTHER PUBLICATIONS

"Intel(R) 41210 Serial to Parallel PCI Bridge". Intel Corporation. Online Sep. 21, 2003. Retrieved from Internet Feb. 23, 2006. <http://web.archive.org/web/20030921080149/http://www.intel.com/design/bridge/41210.htm>.*

Merritt, Rick. "PLX rolls Express switches and bridges". EE Times. Online Apr. 19, 2004. Retrieved from Internet Feb. 23, 2006. <http://www.eetimes.com/showArticle.jhtml?articleID=18901986>.*

Intel 80303 I/O Processor Developer's Manual, Jun. 2000, Chapters 1 and 14.

PCI Local Bus Specification, Rev.2.2, Dec. 18, 1998.

PCI-to-PCI Bridge Architecture Specification, Rev. 1.1, Dec. 18, 1998, Chapter 1,3 and 13.

"Serial ATA: High Speed Serialzed AT Attachment, Serial ATA Workgroup", APT Technologies, Inc.: Revision 1.0,, (Aug. 29, 2001).

DARPA Internet Program, Protocol Specification, "Transmission Control Protocol", (Sep. 1981).

IEEE, "Part 3: Carrier Sense Multiple Access with Collision Detection (CSMA/CD) Access Method and Physical Layer Specifications", Std 802.3, 2000 Edition,(2000).

American National Standard for Information Technology, "Fibre Channel-Physical and Signalling Interface-3 (FC-Ph-3)," X3.303-1998, (Apr. 3, 1998).

PCI, "PCI-X Addendum to the PCI Local Bus Specification", (Jul. 24, 2000).

PCI, "Express Base Specification Revision 1.0", (Jul. 22, 2002).

Internet Protocol, "DARPA Internet Program Protocol Specification", RFC 791,(Sep. 1981).

Postel, J. "Internet Control Message Protocol: DARPA Internet Program Protocol Specification", (Sep. 1981).

Lamers, Lawrence J., "Information Technology: Small Computer System Interface-2", Computer & Business Equipment Manufacturers Association,(Sep. 7, 2003).

American National Standard, Information Technology-Serial Attached SCSI (SAS), Project T10/1562-D, (Oct. 19, 2002).

RAID on Motherboard (ROMB) Considerations Using Intel 80321 I/O Processor, Intel Corporation. Jun. 2002.

* cited by examiner

INTEGRATED CIRCUIT HAVING PROCESSOR AND BRIDGING CAPABILITIES

FIELD

This disclosure relates to an integrated circuit having processor and bridging capabilities.

BACKGROUND

In one conventional data storage arrangement, a host includes a plurality of host processors coupled to a host bridge/bus system. The host bridge/bus system is also coupled via a proprietary bus link to an input/output (I/O) bridge. The I/O bridge is coupled to an I/O processor via a first industry standard bus. The I/O processor includes a bridge that couples the first industry standard bus to a second industry standard bus. An I/O controller is coupled to the second industry bus, and is also coupled to a redundant array of inexpensive disks (RAID). Each of the industry standard buses is compatible with the same bus protocol.

In this conventional arrangement, the host processors, host bridge/bus system, I/O bridge, and I/O processor each comprise a separate, respective integrated circuit chip. In operation, a host processor may issue to the I/O processor, and/or the I/O processor may issue to a host processor data and/or commands. Such data and/or commands propagate through the I/O bridge. This introduces propagation delay in the transmission, and/or reduces the maximum possible transmission bandwidth, of such data and/or commands in this conventional arrangement.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
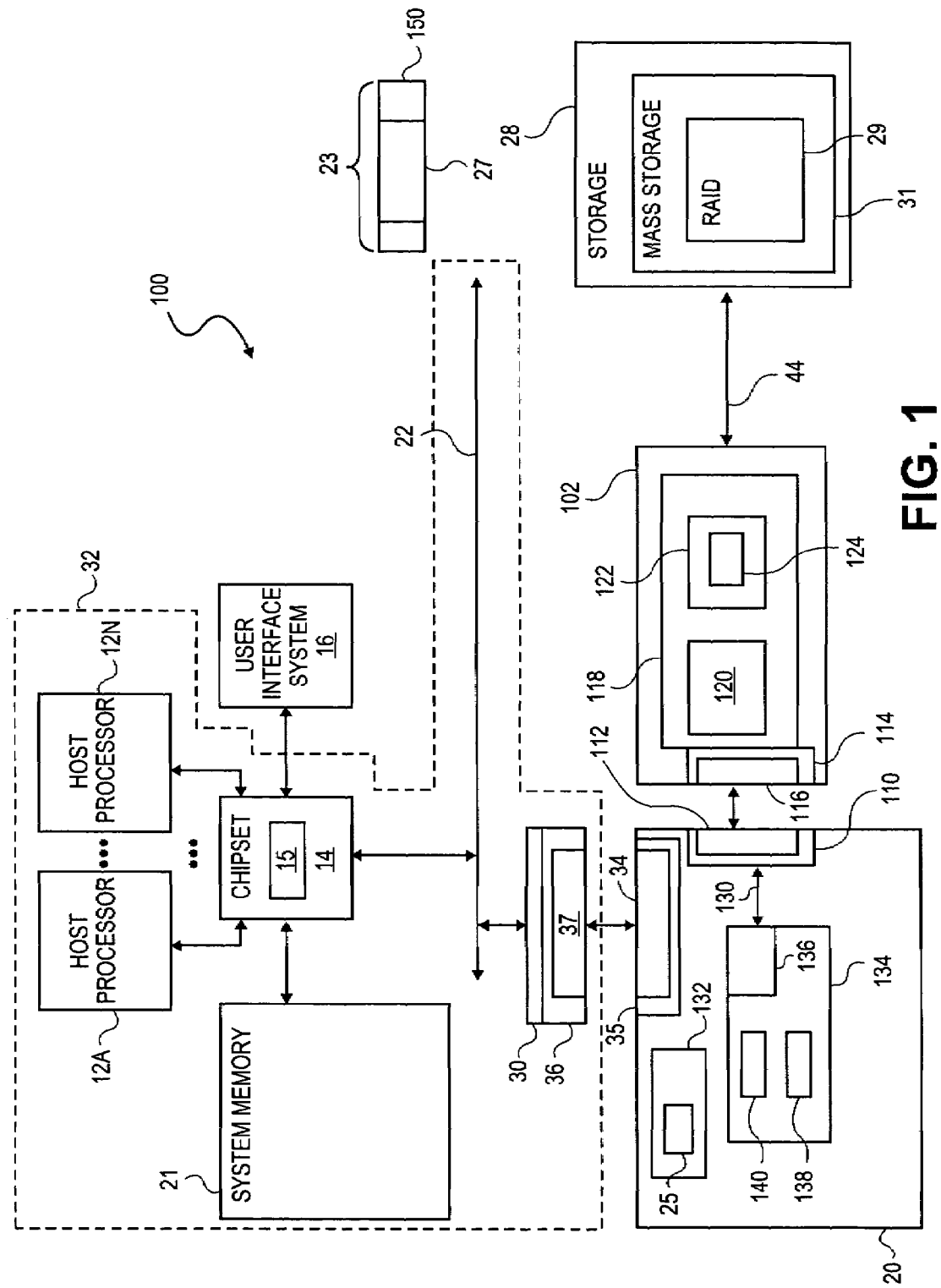
FIG. 1 is a diagram illustrating a system embodiment.

FIG. 1 illustrates a system embodiment 100. System 100 may include one or a plurality of host processors 12A ... 12N. Each of the host processors 12A ... 12N may be coupled (e.g., via a respective segment of a proprietary bus) to a chipset 14. Each host processor 12A ... 12N may comprise, for example, a respective Intel® Pentium® 4 microprocessor that is commercially available from the Assignee of the subject application. Of course, alternatively, each of the host processors 12A ... 12N may comprise, for example, a respective microprocessor that is manufactured and/or commercially available from a source other than the Assignee of the subject application, without departing from this embodiment.

Chipset 14 may comprise a memory controller hub 15 that may comprise a host bridge/hub system that may couple host processors 12A ... 12N, a system memory 21 and a user interface system 16 to each other and to a bus system 22. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Bus 22 may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the bus protocol described in PCI Local Bus Specification, Revision 2.2, Dec. 18, 1998 available from the PCI Special Interest Group, Portland, Oreg., U.S.A. (hereinafter referred to as a "PCI bus"). Also alternatively, bus 22 may comprise other types of bus systems, without departing from this embodiment.

Controller circuit card 102 may be coupled to and control the operation of storage 28. In this embodiment, storage 28 may comprise mass storage 31 that may comprise, e.g., one or more redundant arrays of independent disks (RAID) 29. The RAID level that may be implemented by RAID 29 may be 0, 1, or greater than 1. Depending upon, for example, the RAID level implemented in RAID 29, the number of storage devices comprised in RAID 29 may vary so as to permit the number of such storage devices to be at least sufficient to implement the RAID level implemented in RAID 29.

As used herein, the terms "storage" and "storage device" may be used interchangeably to mean one or more apparatus into, and/or from which, data may be stored and/or retrieved, respectively. Also, as used herein, the term "mass storage" means storage capable of non-volatile storage of data. For example, in this embodiment, mass storage may include, without limitation, one or more non-volatile magnetic, optical, and/or semiconductor storage devices. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

Controller circuit card 102 may comprise operative circuitry 118. Operative circuitry 118 may comprise storage I/O controller 120 and memory 122.

Processors 12A ... 12N, system memory 21, chipset 14, bus 22, and circuit card slot 30 may be comprised in a single circuit board, such as, for example, a system motherboard 32. Storage 28 may be comprised in one or more respective enclosures that may be separate from the enclosure in which the motherboard 32 and the components comprised in the motherboard 32 are enclosed.

Card 102 may be coupled to storage 28 via one or more communication links 44. When card 102 is so coupled to storage 28, controller 120 also may be coupled to storage 28 via one or more links 44. One or more links 44 may be compatible with one or more communication protocols, and card 102 and/or controller 120 may exchange data and/or commands with storage 28, via links 44, in accordance with these one or more communication protocols. For example, one or more links 44 may be compatible with, and card 102 and/or controller 120 may exchange data and/or commands with storage 28 via links 44 in accordance with, e.g., a Fibre Channel (FC) protocol, Small Computer Systems Interface (SCSI) protocol, Ethernet protocol, Transmission Control Protocol/Internet Protocol (TCP/IP) protocol, Serial Advanced Technology Attachment (S-ATA) protocol and/or Serial Attached Small Computer Systems Interface (SAS) protocol. Of course, alternatively, one or more links 44 may be compatible with, and/or I/O controller card 102 and/or controller 120 may exchange data and/or commands with storage 28 in accordance with other and/or additional communication protocols, without departing from this embodiment.

In accordance with this embodiment, if one or more links 44 are compatible with, and/or I/O controller card 102 and/or controller 120 exchange data and/or commands with storage 28 in accordance with FC protocol, the FC protocol may comply or be compatible with the interface/protocol described in ANSI Standard Fibre Channel (FC) Physical and Signaling Interface-3 X3.303:1998 Specification. Alternatively or additionally, if one or more links 44 are compatible with, and/or I/O controller card 102 and/or controller 120 exchange data and/or commands with storage 28 in accordance with SCSI protocol, the SCSI may comply or be compatible with the protocol described in American National Standards Institute (ANSI) Small Computer Systems Interface-2 (SCSI-2) ANSI X3.131-1994 Specification. Also alternatively or additionally, if one or more links 44 are compatible with, and/or I/O controller card 102 and/or controller 120 exchange data and/or commands with storage 28 in accordance with an Ethernet protocol, the Ethernet protocol may comply or be compatible with the protocol described in Institute of Electrical and Electronics Engineers, Inc. (IEEE) Std. 802.3, 2000 Edition, published on Oct. 20, 2000. Further alternatively or additionally, if one or more links 44 are compatible with, and/or I/O controller card 102 and/or controller 120 exchange data and/or commands with storage 28 in accordance with TCP/IP protocol, the TCP/IP protocol may comply or be compatible with the protocols described in Internet Engineering Task Force (IETF) Request For Comments (RFC) 791 and 793, published September 1981. Also alternatively or additionally, if one or more links 44 are compatible with, and/or I/O controller card 102 and/or controller 120 exchange data and/or commands with storage 28 in accordance with an S-ATA protocol, the S-ATA protocol may comply or be compatible with the protocol described in "Serial ATA: High Speed Serialized AT Attachment," Revision 1.0, published on Aug. 29, 2001 by the Serial ATA Working Group. Further alternatively or additionally, if one or more links 44 are compatible with, and/or I/O controller card 102 and/or controller 120 exchange data and/or commands with storage 28 in accordance with SAS protocol, the SAS may comply or be compatible with the protocol described in "Information Technology—Serial Attached SCSI (SAS)," Working Draft American National Standard of International Committee For Information Technology Standards (INCITS) T10 Technical Committee, Project T10/1562-D, Revision 2b, published 19 Oct. 2002, by American National Standards Institute.

Card 102 may include bus interface 114. Bus interface 114 may include a bus connector 116. Machine-readable program instructions may be stored in memory 122. In operation of system 100, these instructions may be accessed and executed by controller 120. When executed by controller 120, these instructions may result in controller 120, operative circuitry 118, and/or card 102 performing the operations described herein as being performed by controller 120, operative circuitry 118, and/or card 102. Memory 122 may comprise one or more configuration information registers 124 that may store information that may indicate, relate to, and/or be used to facilitate the configuration and/or control of card 102, circuitry 118, controller 120, one or more devices comprised in card 102, circuitry 118, controller 120, and/or one or more operations and/or features of card 102, circuitry 118, controller 120, and/or such one or more devices. As used herein, a first device may be considered to be controlled or under the control of a second device, if the second device may supply one or more signals to the first device that may result in change and/or modification, at least in part, of first device's operation. Also as used herein, the configuring of such a first device by such a second device may comprise the supplying by the second device of one or more signals that may be result in selection, change, and/or modification of one or more values and/or parameters stored in the first device that may result in change and/or modification of at least one operational characteristic and/or mode of the first device.

System 100 also may comprise a circuit card 20. In this embodiment, circuit card 20 may comprise an integrated circuit 134, computer-readable memory 132, bus interface 35, bus interface 110, and bus system 130. Alternatively, although not shown in the Figures, integrated circuit 134 may comprise memory 132. As used herein, an "integrated circuit" means a semiconductor device and/or microelectronic device, such as, for example, a semiconductor integrated circuit chip. Memories 132 and/or 21 each may comprise one or more of the following types of memories: semiconductor firmware memory, programmable memory, non-volatile memory, read only memory, electrically programmable memory, random access memory, flash memory, magnetic disk memory, and/or optical disk memory. For example, in this embodiment, memory 132 may comprise double data rate (DDR) synchronized dynamic random access memory (SDRAM). Either additionally or alternatively, memories 132 and/or 21 each may comprise other and/or later-developed types of computer-readable memory.

Integrated circuit 134 may comprise I/O processor 140, bridge 138, and circuitry 136. Processor 140 and bridge 138 each may be coupled to circuitry 136. Circuitry 136 may comprise circuit connections (not shown) that may permit circuitry 136 to be capable of coupling, in parallel, both processor 140 and bridge 138 to bus 130. As a result, in operation of integrated circuit 134, processor 140 and bridge 138 may be coupled via circuitry 136 and bus 130 to bus interface 110. The connections comprised in circuitry 136 also may permit circuitry 136 to be capable of coupling, in parallel, both processor 140 and bridge 138 to bus interface 35. As a result, in operation of integrated circuit 134, processor 140 and bridge 138 may be coupled via circuitry 136 to bus interface 35. Additionally, processor 140 may be coupled to bridge 138.

In this embodiment, bus 130 may comprise a bus that complies with the bus protocol described in the PCI-X Specification Rev. 1.0a, Jul. 24, 2000, available from the aforesaid PCI Special Interest Group, Portland, Oreg., U.S.A. (hereinafter referred to as a "PCI-X bus"). Alternatively, bus 130 may comprise other types of bus systems, without departing from this embodiment.

In this embodiment, the one or more links 44 may be compatible with, and/or I/O controller card 102 and/or controller 120 may exchange data and/or commands with storage 28 in accordance with one or more protocols that may be different from the bus protocols with which buses 22 and 130 may be respectively compatible. Additionally, the bus protocol with which bus 22 may be compatible may be different from the bus protocol with which bus 130 may be compatible.

As used herein, a "bridge" means circuitry capable of coupling at least one segment of at least one bus to at least one segment of at least one other bus. As used herein, a "bus"

means a system that is capable of coupling at least two devices together. In this embodiment, in operation, bridge 138 may be capable of converting and/or translating one or more bus transactions and/or operations of a first bus in accordance with a first bus protocol into one or more bus transactions and/or operations of a second bus in accordance with a second bus protocol that is different from the first bus protocol, and vice versa. For example, in this embodiment, in operation, bridge 138 may be capable of converting and/or translating one or more bus transactions and/or operations of bus 22 into one or more bus transactions and/or operations of bus 130.

As used herein, a "processor" means circuitry capable of performing, at least in part, one or more arithmetic and/or logical operations. Also as used herein, an "I/O processor" means a processor capable of performing, at least in part, one or more operations that may facilitate and/or result in, at least in part, one or more I/O operations and/or one or more operations related to and/or associated with, at least in part, one or more I/O operations. In this embodiment, I/O processor 140 may comprise a general purpose processor (not shown), and memory that is capable of being accessed by the general purpose processor.

Machine-readable program instructions may be stored in memory 132 and/or memory 21. In operation of system 100, these instructions may be accessed and executed by processor 140 and/or one or more of the host processors 12A . . . 12N. When executed by processor 140 and/or one or more of the host processors 12A . . . 12N, these instructions may result in processor 140, integrated circuit 134, card 20, one or more host processors 12A . . . 12N, and/or system 100 performing the operations described herein as being performed by processor 140, integrated circuit 134, card 20, one or more host processors 12A . . . 12N, and/or system 100.

Slot 30 may comprise a bus interface 36 that may comprise connector 37. Card 20 may comprise bus interface 35 that may comprise connector 34. Card 20 that may be constructed to permit card 20 to be inserted into slot 30. When card 20 is properly inserted into slot 30, connectors 34 and 37 may become electrically and mechanically coupled to each other. When connectors 34 and 37 are so coupled to each other, card 20 may become electrically coupled to bus 22, and integrated circuit 134 may exchange data and/or commands with system memory 21, one or more host processors 12A . . . 12N, and/or user interface system 16 via bus 22 and chipset 14.

Bus interface 110 may comprise connector 112. Bus interface 114 may comprise connector 116. Card 20 and card 102 may be constructed to permit connector 116 to be inserted into connector 112. When connector 116 is properly inserted into connector 112, connectors 116 and 112 may become electrically and mechanically coupled to each other. When connectors 112 and 116 are so coupled to each other, operative circuitry 118 may become electrically coupled to bus 130, and operative circuitry 118 may exchange data and/or commands with integrated circuit 134.

Alternatively, without departing from this embodiment, some or all of the operative circuitry of card 20 and/or card 102 may not be comprised in card 20 and/or card 102, but instead, may be comprised in other structures, systems, and/or devices. These other structures, systems, and/or devices may be, for example, comprised in motherboard 32, and exchange data and/or commands with other components (such as, for example, system memory 21, one or more host processors 12A . . . 12N, and/or user interface system 16) in system 100.

Figure 2:
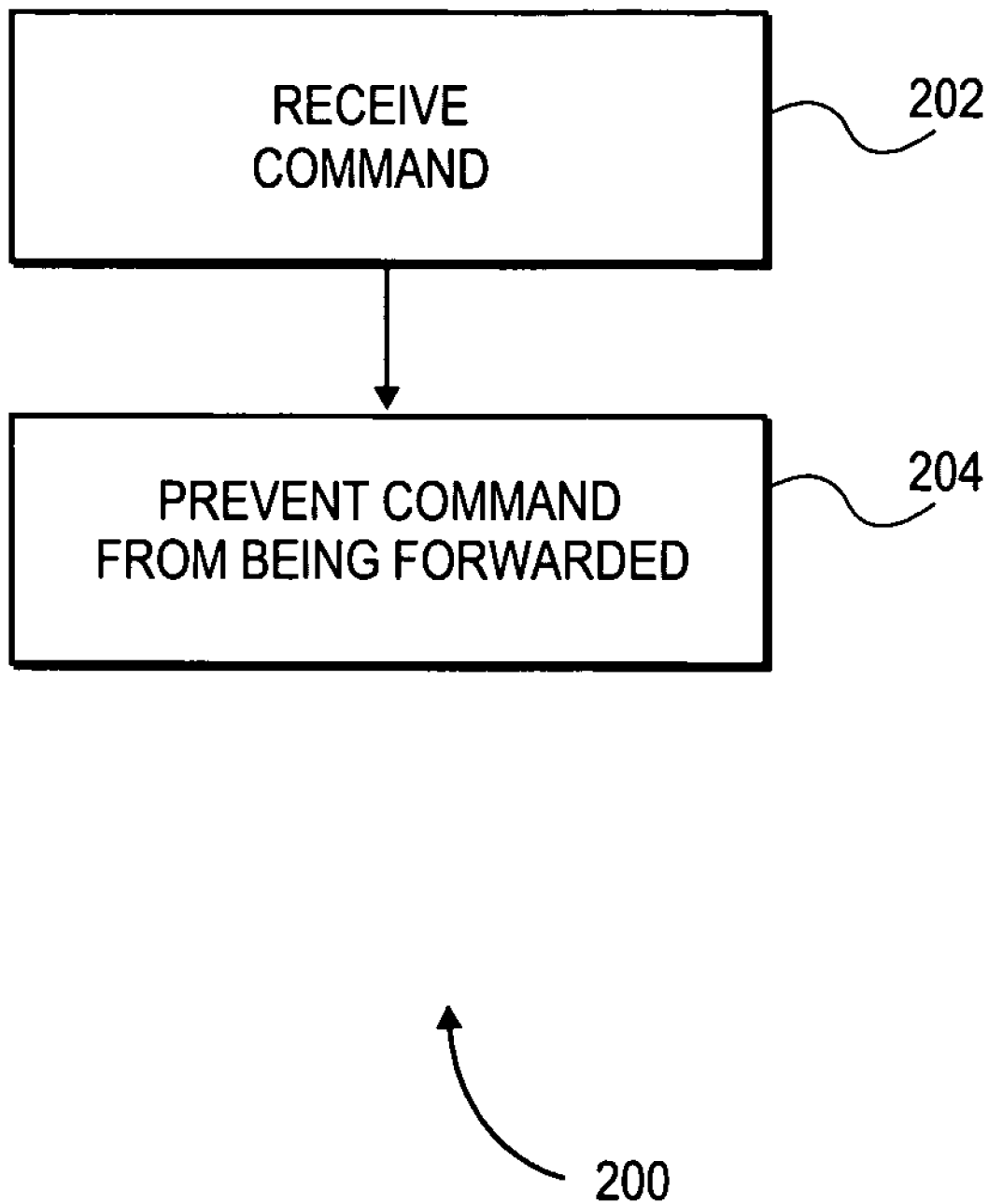
FIG. 2 is a flowchart illustrating operations that may be performed according to an embodiment.

FIG. 2 is flowchart illustrating operations 200 that may be performed in system 100 according to an embodiment. In this embodiment, after, for example, a reset of system 100, one or more of the host processors 12A . . . 12N (e.g., host processor 12A) may transmit via bus 22 one or more host configuration read requests, in accordance with, for example, the bus protocol with which bus 22 may be compatible, requesting configuration information of devices that may be accessible via bus 22, in order to enable host processor 12A to configure and/or control such devices.

In this embodiment, card 20 and/or integrated circuit 134 may receive one or more such configuration read requests from host processor 12A. In response, at least in part, to receipt of one or more such configuration read requests, I/O processor 140 may signal integrated circuit 134 and/or card 20. This may result in card 20 issuing retry responses, in accordance with the bus protocol with which bus 22 may be compatible. This may result in host processor 12A being prevented, at least temporarily, from configuring card 20, integrated circuit 134, card 102, circuitry 118, and controller 120.

This signaling of integrated circuit 134 and/or card 20 by processor 140 also may result in integrated circuit 134 scanning bus 130, in accordance with the bus protocol with which bus 130 may comply, to permit processor 140 to discover, in accordance with this bus protocol, devices coupled to bus 130 that may be controllable and/or configurable by processor 140. As part of this scan of bus 130, integrated circuit 134 may transmit via bus 130 to operative circuitry 118 and/or controller 120 one or more configuration read requests in accordance with the bus protocol with which bus 130 may comply. This may result in operative circuitry 118 and/or controller 120 reading the configuration information stored in one or more registers 124, and transmitting one or more configuration read responses to integrated circuit 134 and/or processor 140 via bus 130. These one or more configuration read responses may comprise and/or indicate the configuration information read from one or more registers 124. Based at least in part upon this configuration information, processor 140 may determine and/or discover, at least in part, in accordance with the bus protocol with which bus 130 may comply, card 102, operative circuitry 118, and/or controller 120, and/or the configuration, operation, and/or features of card 102, operative circuitry 118, and/or controller 120.

As used herein, a first device may be considered to be "configurable" by a second device, if the second device is capable, at least in part, of controlling and/or selecting at least one feature, mode, and/or characteristic of operation of the first device. As used herein, a "bus scan" involves the issuance of one or more requests (such as, for example, configuration read requests) to one or more addresses of a bus to obtain one or more responses (such as, for example, configuration read responses) that may be, and/or contain information indicative of the existence, characteristics, type, and/or operation of one or more devices accessible via the bus.

Contemporaneously, before, or after the signaling of integrated circuit 134 by processor 140, the processor 140 may issue to the bridge 138 a request that the bridge 138 prevent a command received at the bridge from host processor 12A via bus 22 be prevented by bridge 138 from being forwarded from bridge 138 via bus 130. For example, in this embodiment, in response, at least in part, to the receipt of this request by bridge 138, one or more values may be stored in one or more control registers (not shown) in integrated circuit 134. Thereafter, bridge 138 may receive a command (e.g., in this embodiment, a host configuration read request) from host processor 12A via bus 22, as illustrated by operation 202 in FIG. 2. In this embodiment, the storing of the one or more values in the one or more control registers may result in bridge 138 preventing the forwarding (e.g., not forwarding) the command to bus 130, as illustrated by operation 204 in FIG. 2, and also may result in bridge 138 issuing to host processor 12A, in response at least in part to receipt at bridge 138 of the command, a null response via bus 22; this null response may be in accordance with the bus protocol with which bus 22 may comply. In this embodiment, the "forwarding" to bus 130 by bridge 138 of a command received at bridge 138 via bus 22 may comprise, for example, translating of the command into one or more other commands that may be in accordance with the bus protocol of bus 130 and may be equivalent to the command received at bridge 138 via bus 22. Effectively, this may prevent host processor 12A from discovering card 102, operative circuitry 118, and/or controller 120.

After processor 140 has determined and/or discovered, at least in part, card 102, operative circuitry 118, and/or controller 120, and/or the configuration, operation, and/or features of card 102, operative circuitry 118, and/or controller 120, processor 140 may signal integrated circuit 134. This may result in card 20 issuing to card 102 via bus 130 one or more requests to write one or more values into one or more registers 124 that may facilitate and/or permit control, at least in part, of card 102, operative circuitry 118, and/or controller 120 by processor 140; this also may result in card 20 issuing to card 102 via bus 130 one or more queries to card 102, operative circuitry 118, and/or controller 120 requesting that card 102, operative circuitry 118, and/or controller 120 provide processor 140 with an indication of resources (e.g., in this embodiment, a size of an address space comprising a subset of the addresses of bus 22) in system 100 that card 102, operative circuitry 118, and/or controller 120 requests be assigned to card 102, operative circuitry 118, and/or controller 120. In response, at least in part, to these one or more requests and/or queries, card 102, operative circuitry 118, and/or controller 120 may write these one or more values into one or more registers 124, and/or may provide to processor 140 a request for assignment of resources in system 100 that card 102, operative circuitry 118, and/or controller 120. This request may include an indication of the resources that card 102, operative circuitry 118, and/or controller 120 requests be assigned to card 102, operative circuitry 118, and/or controller 120.

Thereafter, based at least in part upon this indication provided to processor 140, the configuration information comprised in one or more configuration read responses from card 102, operative circuitry 118, and/or controller 120, and/or configuration information associated with card 20, processor 140, and/or bridge 138 and stored in card 20, processor 140 may determine a total set of resources in system 100 that processor 140 may request be assigned by host 12A to permit card 20, processor 140, bridge 138, card 102, operative circuitry 118, and/or controller 120 to be properly configured and to operate appropriately. As used herein, a "resource" of a system may include a facility, instrumentality, and/or identifier for such facility and/or instrumentality in the system that may be allocated (e.g., granted) from a pool of facilities, instrumentalities, and/or identifiers, for use by and/or association with one or more devices in the system.

Thereafter, processor 140 may signal integrated circuit 134 and/or card 20. This may result in card 20 no longer issuing retry responses in accordance with the bus protocol with which bus 22 may be compatible. Subsequently, host processor 12A may issue via bus 22 a host configuration read request that may be received by card 20. In response, at least in part, to the host configuration read request received by card 20, processor 140 may signal integrated circuit 134 and/or card 20. This may result in card 20 providing to host processor 12A configuration information that may include configuration information associated with card 20, processor 140, and/or bridge 138, and appropriate configuration information previously obtained by processor 140 from one or more registers 124 to permit card 20, processor 140, bridge 138, card 102, operative circuitry 118, and/or controller 120 to be properly configured and to operate appropriately.

Processor 12A thereafter may issue to card 20, integrated circuit 134, bridge 138, and/or processor 140 via bus 22 one or more requests to write one or more values into one or more registers (not shown) in card 20, integrated circuit 134, bridge 138, and/or processor 140 that may facilitate and/or permit control, at least in part, of card 20, integrated circuit 134, bridge 138, and/or processor 140 by host processor 12A. In response, at least in part, to these one or more write requests, card 20, integrated circuit 134, bridge 138, and/or processor 140 may write into these one or more registers these one or more values. Processor 12A also may issue to card 20, integrated circuit 134, bridge 138, and/or processor 140 via bus 22 one or more queries requesting that card 20, integrated circuit 134, bridge 138, and/or processor 140 provide processor 12A with an indication of resources (e.g., in this embodiment, a size of an address space comprising a subset of the addresses of bus 22) in system 100 that card 20, integrated circuit 134, bridge 138, and/or processor 140 request be assigned to card 20, integrated circuit 134, bridge 138, and/or processor 140. In response, at least in part, to these one or more queries, card 20, integrated circuit 134, bridge 138, and/or processor 140 may transmit to processor 12A via bus 22 a request to be allocated the total set of resources in system 100 that processor 140 previously determined should be assigned by host 12A to permit card 20, processor 140, bridge 138, card 102, operative circuitry 118, and/or controller 120 to be properly configured and to operate appropriately. This request may include an indication of this total set of resources whose allocation is being requested. Thus, this request may be based, at least in part upon a subset of the total set of resources, which subset comprises resources was previously requested by card 102, circuitry 118, and/or controller 120 to be assigned to card 102, circuitry 118, and/or controller 120.

Thereafter, based at least in part upon this indication provided to processor 12A and the configuration information previously provided to processor 12A by card 20, processor 12A may determine to assign to card 20, integrated circuit 134, bridge 138, and/or processor 140 the total set of resources requested by card 20, integrated circuit 134, bridge 138, and/or processor 140. For example, in this embodiment, if this total set of resources comprises an address space that comprises a subset of the addresses of bus 22, processor 12A may assign to card 20, integrated circuit 134, bridge 138, and/or processor 140 an address space (shown symbolically by the structure referred to by numeral 23 in FIG. 1) 23 that comprises a subset of the addresses of bus 22. Processor 12A thereafter may provide to processor 140 via bus 22 one or more values that may indicate and/or specify address space 23.

Thereafter, processor 140 may assign to card 102, operative circuitry 118, and/or controller 120 one or more subsets of the total set of resources assigned by processor 12A to card 20, integrated circuit 134, bridge 138, and/or processor 140.

For example, in this embodiment, after processor 12A has provided the one or more values to processor 140 that may indicate and/or specify address space 23, processor 140 may execute in memory 132 one or more program processes 25. The execution by processor 140 of these one or more program processes 25 may result in processor 140 assigning to card 20, processor 140, bridge 138, and/or integrated circuit 134 one or more subsets 27 of space 23. The execution by processor 140 of these one or more program processes 25 also may result in processor 140 assigning to card 102, operative circuitry 118, and/or controller 120 one or more subsets 150 of space 23. Processor 140 may make the assignments of subsets 27 and/or 150, based at least in part upon the previously provided indications of the resources whose assignment was requested by card 20, processor 140, bridge 138, integrated circuit 134, card 102, operative circuitry 118, and/or controller 120, and/or the configuration information comprised in the one or more configuration read responses provided by card 20, processor 140, bridge 138, integrated circuit 134, card 102, operative circuitry 118, and/or controller 120. Processor 140 may provide store in one or more registers (not shown) in card 20 one or more values that may indicate and/or specify one or more subsets 27. Additionally, processor 140 may provide to card 102, operative circuitry 118, and/or controller 120 via bus 130 one or more other values that may indicate and/or specify one or more subsets 150. Thereafter, card 20, processor 140, bridge 138, and/or integrated circuit 134 may utilize (e.g., claim and/or be accessible via) one or more subsets 27 in accordance with the assignment of resources made by processor 140 to card 20, processor 140, bridge 138, and/or integrated circuit 134, and card 102, operative circuitry 118, and/or controller 120 may utilize (e.g., claim and/or be accessible via) one or more subsets of 150 in accordance with the assignment of resources made by processor 140 to card 102, operative circuitry 118, and/or controller 120.

After processor 12A has ceased issuing configuration read requests via bus 22, processor 12A may signal card 20. This may result in processor 140 issuing a request to bridge 138 that bridge 138 forward via bus 130 commands and/or data received by bridge 138 via bus 22. This may permit card 102, circuitry 118, and/or controller 120 to exchange data and/or commands, via bridge 138, with components of system 100 that may be coupled to bus 22.

Also after processor 12A has ceased issuing configuration read requests via bus 22, processor 12A may issue to card 20 one or more requests to store in and/or retrieve data from storage 28. This may result in processor 140 issuing one or more commands to controller 120 via bus 130 that may result in controller 120 issuing to storage 28 one or more commands via one or more links 44. In response, at least in part, to these one or more commands from controller 120, storage 28 may store data in and/or retrieve data from storage 28, as per the one or more requests from processor 12A. Such data retrieved from storage 28 may be transmitted via one or more links 44 to operative circuitry 118, and thence, may be transmitted by operative circuitry 118 to card 20. Thereafter, card 20 may provide the retrieved data to processor 12A as per the one or more requests issued by processor 12A.

Alternatively, without departing from this embodiment, if it is desired that processor 12A be permitted to configure and/or control, at least in part, card 102, operative circuitry 118, and/or controller 120, instead of issuing to bridge 138 a request that the bridge 138 prevent one or more commands received at the bridge from host processor 12A via bus 22 from being forwarded from bridge 138 via bus 130, after a reset of system 100, processor 140 may request that bridge 138 forward such commands via bus 130. In this alternate arrangement, the card 20 may not issue to processor 12A retry responses in response to configuration read requests received by card 20 from processor 12A. In this alternate arrangement, this may permit host processor 12A to configure and/or control, at least in part, card 102, operative circuitry 118, and/or controller 120.

Thus, in summary, one system embodiment may comprise a circuit board comprising a first processor and a controller hub coupled to the first processor. The circuit board also may comprise a first bus coupled to the controller hub. The first bus may be compatible with a first bus protocol. The system of this embodiment also may comprise a circuit card comprising a device capable of being coupled to a second bus. The second bus may be compatible with a second bus protocol. The first bus protocol and the second bus protocol may be different from each other. This system embodiment also may comprise an integrated circuit comprising a second processor, a bridge, and circuitry capable of coupling the bridge and the processor to the first bus and to the second bus. The bridge may be capable of receiving, via the first bus, a command issued from the first processor. The bridge may be capable of preventing, in response at least in part to a request from the second processor, the command from being forwarded from the bridge to the second bus.

Advantageously, in this system embodiment, both the second processor and the bridge may be coupled to the first bus and to the second bus. In this system embodiment, this may permit data and/or commands to be exchanged between the first and second processors without propagating through the bridge. This may permit reduction in propagation delay in the transmission, and/or increase the maximum possible transmission bandwidth, of such data and/or commands in this system embodiment, compared to the prior art. Additionally, the features of this system embodiment may permit the second processor to be able to configure and/or control, at least in part, the device, and also may prevent the first processor from being able to configure and/or control, at least in part, the device. This may permit the second processor to be able to configure and/or control, at least in part, the device, independently, at least in part, from the first processor.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

What is claimed is:

1. An apparatus comprising:
    an integrated circuit chip comprising an input/output (I/O) processor, a bridge, and circuitry to couple in parallel both the bridge and the processor to a first bus and to a second bus, the processor and the bridge being coupled to the first bus and to the second bus such that at least one of data exchange and command exchange occurs between the processor and a host processor that bypasses being propagated through the bridge, the first bus being compatible with a first bus protocol, the second bus being compatible with a second bus protocol, the bridge being to prevent, in response at least in part to a request from the processor, a command requesting configuration information received at the bridge via the first bus from the host processor from being forwarded from the bridge to the second bus, the processor comprised in the integrated circuit chip being to configure a device coupled to the second bus independently from the host processor, the first bus protocol and the second bus protocol being different from each other, the configuration information being to configure the device coupled to the second bus, the processor comprised in the integrated circuit chip also being to assign to the device a subset of a total set of resources allocated to the integrated circuit chip by the host processor, the subset being based, at least in part, upon an allocation request from the device to the processor comprised in the integrated circuit chip, the total set of resources being based, at least in part, upon another allocation request from the processor comprised in the integrated circuit chip to the host processor, the I/O processor comprising a general purpose processor, the I/O processor being to access and execute program instructions stored in memory, the memory being comprised in a motherboard and in a circuit board, the circuit board to be coupled to the motherboard, execution of the program instructions resulting in the I/O processor performing operations including:
    generating the request from the I/O processor to the bridge,
    assigning to the device the subset of the total set of resources allocated to the integrated circuit chip, and
    generating the another allocation request.

2. The apparatus of claim 1, wherein:
the first bus comprises a Peripheral Component Interconnect (PCI) Express (PCI-Express) bus; and
the second bus comprises a PCI-Extended (PCI-X) bus.

3. The apparatus of claim 1, wherein:
the command comprises a host configuration read request; and
the bridge is to issue, in response at least in part to the configuration read request, a null response to the first bus.

4. The apparatus of claim 1, wherein:
the processor comprised in the integrated circuit chip is to discover, at least in part, the device coupled to the integrated circuit chip via the second bus.

5. A method comprising:
receiving, via a first bus, at a bridge comprised in an integrated circuit chip a command requesting configuration information, the integrated circuit chip also comprising an input/output (I/O) processor and circuitry to couple in parallel both the bridge and the processor to the first bus and to a second bus, the processor and the bridge being coupled to the first bus and to the second bus such that at least one of data exchange and command exchange occurs between the processor and a host processor that by-passes being propagated through the bridge, the first bus being compatible with a first bus protocol, the second bus being compatible with a second bus protocol, the first bus protocol and the second bus protocol being different from each other; and
in response at least in part to a request from the processor comprised in the integrated circuit chip, preventing the command received at the bridge from the host processor from being forwarded from the bridge to the second bus, the processor comprised in the integrated circuit chip being to configure a device coupled to the second bus independently from the host processor, the configuration information being to configure the device coupled to the second bus, the processor comprised in the integrated circuit chip also being to assign to the device a subset of a total set of resources allocated to the integrated circuit chip by the host processor, the subset being based, at least in part, upon an allocation request from the device to the processor comprised in the integrated circuit chip, the total set of resources being based, at least in part, upon another allocation request from the processor comprised in the integrated circuit chip to the host processor, the I/O processor comprising a general purpose processor, the I/O processor being to access and execute program instructions stored in memory, the memory being comprised in a motherboard and in a circuit board, the circuit board to be coupled to the motherboard, execution of the program instructions resulting in the I/O processor performing operations including:
    generating the request from the I/O processor to the bridge,
    assigning to the device the subset of the total set of resources allocated to the integrated circuit chip, and
    generating the another allocation request.

6. The method of claim 5, wherein:
the first bus comprises a Peripheral Component Interconnect (PCI) Express (PCI-Express) bus; and
the second bus comprises a PCI-Extended (PCI-X) bus.

7. The method of claim 5, wherein:
the command comprises a host configuration read request; and
the bridge is to issue, in response at least in part to the configuration read request, a null response to the first bus.

8. The method of claim 5, wherein:
the processor comprised in the integrated circuit chip is to discover, at least in part, the device coupled to the integrated circuit chip via the second bus.

9. An article comprising:
a storage medium storing instructions that when executed by a machine result in the following:
receiving, via a first bus, at a bridge comprised in an integrated circuit chip a command requesting configuration information, the integrated circuit chip also comprising an input/output (I/O) processor and circuitry to couple in parallel both the bridge and the processor to the first bus and to a second bus, the processor and the bridge being coupled to the first bus and to the second bus such that at least one of data exchange and command exchange between the processor and a host processor occurs that by-passes being propagated through the bridge, the first bus being compatible with a first bus protocol, the second bus being compatible with a second bus protocol, the first bus protocol and the second bus protocol being different from each other; and
in response at least in part to a request from the processor comprised in the integrated circuit chip, preventing the command received at the bridge from the host processor from being forwarded from the bridge to the second bus, the processor comprised in the integrated circuit chip being to configure a device coupled to the second bus independently from the host processor, the configuration information being to configure the device coupled to the second bus, the processor comprised in the integrated circuit chip also being to assign to the device a subset of a total set of resources allocated to the integrated circuit chip by the host processor, the subset being based, at least in part, upon an allocation request from the device to the processor comprised in the integrated circuit chip, the total set of resources being based, at least in part, upon another allocation request from the processor comprised in the integrated circuit chip to the host processor, the I/O processor comprising a general purpose processor, the I/O processor being to access and execute program instructions stored in memory, the memory being comprised in a motherboard and in a circuit board, the circuit board to be coupled to the motherboard, execution of the program instructions resulting in the I/O processor performing operations including:
    generating the request from the I/O processor to the bridge, assigning to the device the subset of the total set of resources allocated to the integrated circuit chip, and generating the another allocation request.

10. The article of claim 9, wherein:

the first bus comprises a Peripheral Component Interconnect (PCI) Express (PCI-Express) bus; and the second bus comprises a PCI-Extended (PCI-X) bus.

11. The article of claim 9, wherein:

the command comprises a host configuration read request; and the bridge is to issue, in response at least in part to the configuration read request, a null response to the first bus.

12. The article of claim 9, wherein:

the processor comprised in the integrated circuit chip is to discover, at least in part, the device coupled to the integrated circuit chip via the second bus.

13. A system comprising:

a circuit board comprising a host processor and a controller hub coupled to the host processor, the circuit board also comprising a first bus coupled to the controller hub, the first bus being compatible with a first bus protocol;

a circuit card comprising a device to be coupled to a second bus, the second bus being compatible with a second bus protocol, the first bus protocol and the second bus protocol being different from each other; and an integrated circuit chip comprising a second processor, a bridge, and circuitry to couple in parallel both the bridge and the second processor to the first bus and to the second bus, the second processor and the bridge being coupled to the first bus and to the second bus such that at least one of data exchange and command exchange between the second processor and the host processor occurs that by-passes being propagated through the bridge, the bridge being to receive, via the first bus, a command requesting configuration information issued from the host processor, the bridge being to prevent, in response at least in part to a request from the second processor, the command from being forwarded from the bridge to the second bus, the second processor being to configure a device coupled to the second bus independently from the host processor, the configuration information being to configure the device coupled to the second bus, the second processor also being to assign to the device a subset of a total set of resources allocated to the integrated circuit chip by the host processor, the subset being based, at least in part, upon an allocation request from the device to the second processor, the total set of resources being based, at least in part, upon another allocation request from the second processor to the host processor, the second processor being an input/output (I/O) processor that comprises a general purpose processor, the I/O processor being to access and execute program instructions stored in memory, the memory being comprised in the circuit board and in the circuit card, the circuit card to be coupled to the circuit board, execution of the program instructions resulting in the I/O processor performing operations including:

generating the request from the I/O processor to the bridge, assigning to the device the subset of the total set of resources allocated to the integrated circuit chip, and generating the another allocation request.

14. The system of claim 13, wherein:

the system further comprises storage; and the device comprises a controller to control, at least in part, the storage.

15. The system of claim 14, further comprising:

one or more communication links to couple the controller to the storage, the one or more communication links being compatible with a communication protocol that is different from the first bus protocol and from the second bus protocol.

16. The system of claim 14, wherein:

the storage comprises a redundant array of inexpensive disks (RAID).

\* \* \* \* \*